United States Patent
Mu

(10) Patent No.: US 12,526,078 B2
(45) Date of Patent: Jan. 13, 2026

(54) TRANSMISSION CONFIGURATION METHOD, TRANSMISSION CONFIGURATION APPARATUS AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 350 days.

(21) Appl. No.: 18/031,837

(22) PCT Filed: Oct. 14, 2020

(86) PCT No.: PCT/CN2020/120894
§ 371 (c)(1),
(2) Date: Apr. 13, 2023

(87) PCT Pub. No.: WO2022/077265
PCT Pub. Date: Apr. 21, 2022

(65) Prior Publication Data
US 2023/0388052 A1    Nov. 30, 2023

(51) Int. Cl.
*H04L 1/08* (2006.01)
*H04L 1/00* (2006.01)
*H04W 24/02* (2009.01)

(52) U.S. Cl.
CPC .............. *H04L 1/08* (2013.01); *H04L 1/0003* (2013.01); *H04W 24/02* (2013.01)

(58) Field of Classification Search
CPC ......... H04L 1/08; H04L 1/0003; H04W 24/02
See application file for complete search history.

(56) References Cited

U.S. PATENT DOCUMENTS

| | | |
|---|---|---|
| 2018/0115387 A1 | 4/2018 | Takeda et al. |
| 2019/0044646 A1 | 2/2019 | Xu et al. |
| 2020/0077381 A1 | 3/2020 | Wallen et al. |

FOREIGN PATENT DOCUMENTS

| | | |
|---|---|---|
| CN | 111757501 A | 10/2020 |
| EP | 3528568 A1 | 8/2019 |
| WO | WO 2016070423 A1 | 5/2016 |

OTHER PUBLICATIONS

PCT/CN2020/120894, English translation of Search Report dated Jul. 21, 2021, 2 pages.

(Continued)

*Primary Examiner* — Gbemileke J Onamuti
(74) *Attorney, Agent, or Firm* — Cozen O'Connor

(57) ABSTRACT

The present disclosure relates to a transmission configuration method, a transmission configuration apparatus and a storage medium. The transmission configuration method is applied to a terminal, and includes: determining a parameter related to a first modulation mode; and determining a repetition parameter based on the parameter related to the first modulation mode. Determining a repetition parameter may include, in response to an uplink transmission of the terminal reaching a condition for applying the first modulation mode, determining that the repetition is not performed for the uplink transmission or in response to a downlink transmission of the terminal reaching a condition for applying the first modulation mode, determining that the repetition is not performed for the downlink transmission.

16 Claims, 3 Drawing Sheets

(56) References Cited

OTHER PUBLICATIONS

European Patent Application No. 20957046.4, Search and Opinion dated Jun. 10, 2024, 7 pages.
Indian Patent Application No. 202347033651, Office Action dated Mar. 14, 2024, 5 pages.
Chinese Patent Application No. 202080002794.9, Office Action dated Dec. 1, 2022, 4 pages.
Chinese Patent Application No. 202080002794.9, English translation of Office Action dated Dec. 1, 2022, 6 pages.

TRANSMISSION CONFIGURATION METHOD, TRANSMISSION CONFIGURATION APPARATUS AND STORAGE MEDIUM

CROSS-REFERENCE TO RELATED APPLICATION

This application is a U.S. national phase of International Application No. PCT/CN2020/120894, filed with the State Intellectual Property Office of P. R. China on Oct. 14, 2020, the content of which is incorporated herein by reference in its entirety.

TECHNICAL FIELD

The disclosure relates to a field of wireless communication technology, in particular to a transmission configuration method, a transmission configuration apparatus, and a storage medium.

BACKGROUND

In recent years, the booming development of the Internet of Things (IoT) has brought many conveniences to human life and work. Machine Type Communication (MTC) and Narrow Band Internet of Things (NB-IoT) are typical applications of cellular IoT technologies. At present, these technologies have been widely used in many fields such as smart cities (for example, meter reading), smart agriculture (for example, the collection of information such as temperature and humidity), and smart transportation (for example, sharing bicycles).

NB-IoT introduces 16QAM (Quadrature Amplitude Modulation) for communication transmission. When the terminal is in the 16QAM mode, for a transport block size (TB S) supported in a downlink transmission, the supported maximum TBS can be increased, but for an uplink transmission, the TBS cannot be increased. When the terminal performs data transmission in the 16QAM mode, it can be determined that a data transmission channel state is relatively good. Therefore, determining whether the terminal needs to perform a repetition in the 16QAM mode becomes a key issue.

SUMMARY

According to a first aspect of embodiments of the present disclosure, a transmission configuration method is provided. The method is applied to a terminal and includes:
  determining a parameter related to a first modulation mode; and determining a repetition parameter based on the parameter related to the first modulation mode.

According to a second aspect of embodiments of the disclosure, a transmission configuration apparatus applied to a terminal is provided. The apparatus includes:
  a first determining module, configured to determine a parameter related to a first modulation mode; and a second determining module, configured to determine a repetition parameter based on the parameter related to the first modulation mode.

According to a third aspect of embodiments of the disclosure, a transmission configuration apparatus is provided. The apparatus includes:
  a processor; and a memory configured to store instructions executable by the processor; in which the processor is configured to perform the transmission configuration method according to the first aspect or any embodiment of the first aspect.

According to a fourth aspect of the disclosure, a non-transitory computer-readable storage medium is provided. When instructions in the storage medium are executed by a processor of a mobile terminal, the mobile terminal is caused to perform the transmission configuration method according to the first aspect or any embodiment of the first aspect.

It is to be understood that the foregoing general description and the following detailed description are exemplary and explanatory only and are not restrictive of the present disclosure.

BRIEF DESCRIPTION OF THE DRAWINGS

The accompanying drawings, which are incorporated in and constitute a part of the specification, illustrate embodiments consistent with the disclosure and serve to explain the principles of the disclosure together with the description.

DETAILED DESCRIPTION

Figure 1:
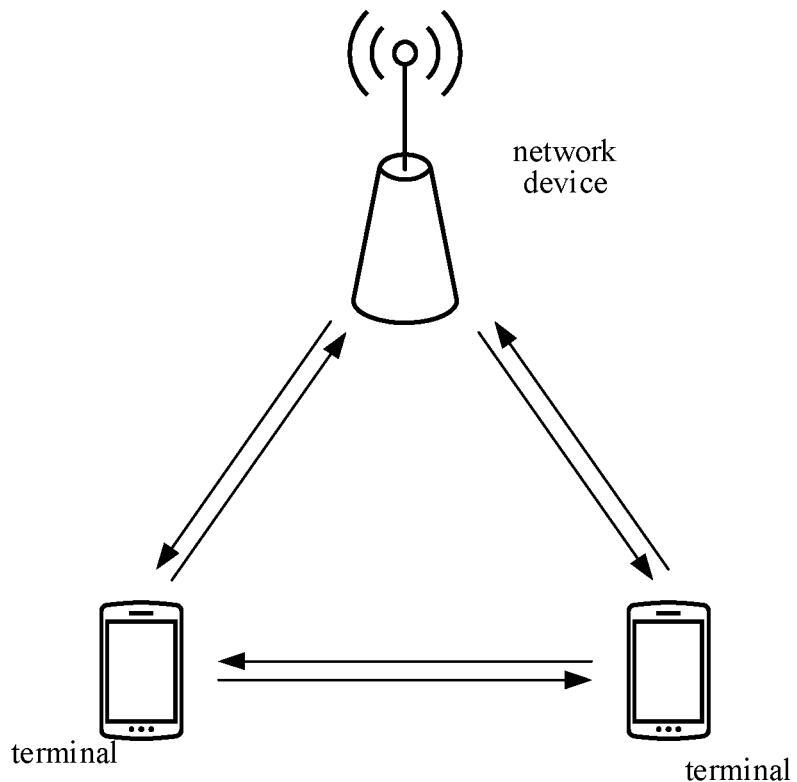
FIG. 1 is a schematic diagram of a communication system between a network device and a terminal according to an embodiment.

Reference will now be made in detail to exemplary embodiments, examples of which are illustrated in the accompanying drawings. The following description refers to the accompanying drawings in which the same or similar numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

In a communication system, for scenarios of low-rate and high-latency (such as meter reading, environmental monitoring, etc.) in the Internet of Things (IoT) business, two related technologies are proposed: MTC and NB-IoT. At present, NB-IoT technology can support a maximum rate of several hundred kilobits, and MTC can support a maximum rate of several megabits. However, with the continuous development of IoT business (such as monitoring, smart home, wearable devices, and industrial sensor detection), a rate of tens to 100 megabits is generally required, and a requirement for delay is relatively increased. Therefore, in the communication system, the two major technologies of MTC and NB-IoT can no longer meet the requirements of the current IoT business. At the same time, on the other hand, MTC and NB-IoT are generally deployed in basements, in the wild and other scenarios where it is not easy to charge or replace batteries. Therefore, the terminal associated with MTC or NB-IoT is limited by hardware, such that the coverage capability is not as good as that of a general wireless communication terminal. Further, due to an influence of the application environment, the power saving of the device is a feature of the two major technologies of MTC and NB-IoT.

For the terminal associated with any of the two major technologies of MTC and NB-IoT, a repetition method is adopted in the related art, so that the device achieves an effect of coverage enhancement by accumulating power through repetition. In other words, the terminal associated with any of the two major technologies of MTC and NB-IoT transmits the same transmission content in multiple time units. The multiple time units may be one subframe or multiple subframes. In order to further improve a transmission rate of NB-IoT, a 16QAM modulation mode is introduced into the wireless communication technology. In the 16QAM modulation mode, for a TBS supported by a physical downlink channel, the network configures the physical downlink channel to allow expansion of the supported maximum TBS. However, for a transmission of a physical uplink channel, it is required that the TBS cannot be increased/expanded. Therefore, when the terminal is configured to support the 16QAM modulation mode, how to configure the repetition becomes a key issue at present.

Accordingly, the present disclosure provides a repetition configuration method. It is designed how to determine the repetition when the terminal is configured to use the 16QAM modulation mode, especially how to configure the repetition of the physical uplink channel when the terminal is in the 16QAM modulation mode.

According to a first aspect of embodiments of the present disclosure, a transmission configuration method is provided. The method is applied to a terminal and includes:
  determining a parameter related to a first modulation mode; and determining a repetition parameter based on the parameter related to the first modulation mode.

In an embodiment, determining the repetition parameter based on the parameter related to the first modulation mode includes:
  in response to an uplink transmission of the terminal reaching a condition for applying the first modulation mode, determining that the repetition is not performed for the uplink transmission;
  or
  in response to a downlink transmission of the terminal reaching a condition for applying the first modulation mode, determining that the repetition is not performed for the downlink transmission;
  or
  in response to an uplink transmission of the terminal reaching a condition for applying the first modulation mode, determining that the repetition is performed for the uplink transmission based on a first repetition rule, in which the first repetition rule is used when the terminal reaches the condition for applying the first modulation mode;
  or
  in response to a downlink transmission of the terminal reaching a condition for applying the first modulation mode, determining that the repetition is performed for the downlink transmission based on a first repetition rule.

In an embodiment, determining the repetition parameter based on the parameter related to the first modulation mode includes:
  in response to both an uplink transmission and a downlink transmission of the terminal reaching a condition for applying the first modulation mode, determining that the repetition is not performed for the uplink transmission and the downlink transmission;
  or
  in response to both an uplink transmission and a downlink transmission of the terminal reaching a condition for applying the first modulation mode, determining that the repetition is not performed the uplink transmission;
  or
  in response to both an uplink transmission and a downlink transmission of the terminal reaching a condition for applying the first modulation mode, determining that the repetition is not performed the downlink transmission;
  or
  in response to both an uplink transmission and a downlink transmission of the terminal reaching a condition for applying the first modulation mode, determining that the repetition is performed for the uplink transmission and/or the downlink transmission based on a first repetition rule, in which the first repetition rule is used when the terminal reaches the condition for applying the first modulation mode.

In an embodiment, determining the repetition parameter based on the parameter related to the first modulation mode includes:
  in response to an uplink transmission of the terminal reaching a condition for applying the first modulation mode, determining the repetition parameter corresponding to the uplink transmission from a set of candidate repetition parameters;
  and/or,
  in response to a downlink transmission of the terminal reaching a condition for applying the first modulation mode, determining the repetition parameter corresponding to the downlink transmission from a set of candidate repetition parameters.

In an embodiment, determining the repetition parameter based on the parameter related to the first modulation mode includes:
  in response to both an uplink transmission and a downlink transmission of the terminal reaching a condition for applying the first modulation mode, determining the repetition parameter corresponding to the uplink transmission from a set of candidate repetition parameters;
  or
  in response to both an uplink transmission and a downlink transmission of the terminal reaching a condition for applying the first modulation mode, determining the repetition parameter corresponding to the downlink transmission from a set of candidate repetition parameters;
  or
  in response to both an uplink transmission and a downlink transmission of the terminal reaching a condition for applying the first modulation mode, determining the repetition parameters corresponding respectively to the uplink transmission and the downlink transmission from a set of candidate repetition parameters.

In an embodiment, the method further includes:
  receiving a first indication message, in which the first indication message is configured to indicate a set of candidate repetition parameters.

In an embodiment, the set of candidate repetition parameters is a proper subset of a first set of numbers of repetition times; the first set of numbers of repetition times includes all candidate numbers of repetition times.

In an embodiment, the first repetition rule is determined based on a number of bits occupied by an indicator for indicating an adopted number of repetition times when the terminal satisfies a use condition of the first modulation mode;

or the first repetition rule is determined based on a set of candidate numbers of repetition times when the terminal satisfies a use condition of the first modulation mode.

In an embodiment, reaching the condition for applying the first modulation mode includes at least one of:

a physical channel satisfying a use condition of the first modulation mode;

the terminal being configured with the parameter related to the first modulation mode;

the terminal being configured with a modulation and coding scheme (MCS) table corresponding to the first modulation mode.

In an embodiment, the first modulation mode is a 16-symbol quadrature amplitude modulation (16QAM).

According to a second aspect of embodiments of the disclosure, a transmission configuration apparatus applied to a terminal is provided. The apparatus includes:

a first determining module, configured to determine a parameter related to a first modulation mode; and a second determining module, configured to determine a repetition parameter based on the parameter related to the first modulation mode.

In an embodiment, the second determining module is configured to:

in response to an uplink transmission of the terminal reaching a condition for applying the first modulation mode, determine that the repetition is not performed for the uplink transmission;

or in response to a downlink transmission of the terminal reaching a condition for applying the first modulation mode, determine that the repetition is not performed for the downlink transmission;

or in response to an uplink transmission of the terminal reaching a condition for applying the first modulation mode, determine that the repetition is performed for the uplink transmission based on a first repetition rule, in which the first repetition rule is used when the terminal reaches the condition for applying the first modulation mode;

or in response to a downlink transmission of the terminal reaching a condition for applying the first modulation mode, determine that the repetition is performed for the downlink transmission based on a first repetition rule.

In an embodiment, the second determining module is configured to:

in response to both an uplink transmission and a downlink transmission of the terminal reaching a condition for applying the first modulation mode, determine that the repetition is not performed for the uplink transmission and the downlink transmission;

or in response to both an uplink transmission and a downlink transmission of the terminal reaching a condition for applying the first modulation mode, determine that the repetition is not performed the uplink transmission;

or in response to both an uplink transmission and a downlink transmission of the terminal reaching a condition for applying the first modulation mode, determine that the repetition is not performed the downlink transmission;

or in response to both an uplink transmission and a downlink transmission of the terminal reaching a condition for applying the first modulation mode, determine that the repetition is performed for the uplink transmission and/or the downlink transmission based on a first repetition rule, in which the first repetition rule is used when the terminal reaches the condition for applying the first modulation mode.

In an embodiment, the second determining module is configured to:

in response to an uplink transmission of the terminal reaching a condition for applying the first modulation mode, determine the repetition parameter corresponding to the uplink transmission from a set of candidate repetition parameters;

and/or, in response to a downlink transmission of the terminal reaching a condition for applying the first modulation mode, determine the repetition parameter corresponding to the downlink transmission from a set of candidate repetition parameters.

In an embodiment, determining the repetition parameter based on the parameter related to the first modulation mode includes:

in response to both an uplink transmission and a downlink transmission of the terminal reaching a condition for applying the first modulation mode, determining the repetition parameter corresponding to the uplink transmission from a set of candidate repetition parameters;

or in response to both an uplink transmission and a downlink transmission of the terminal reaching a condition for applying the first modulation mode, determining the repetition parameter corresponding to the downlink transmission from a set of candidate repetition parameters;

or in response to both an uplink transmission and a downlink transmission of the terminal reaching a condition for applying the first modulation mode, determining the repetition parameters corresponding respectively to the uplink transmission and the downlink transmission from a set of candidate repetition parameters.

In an embodiment, the apparatus is further configured to:

receive a first indication message, in which the first indication message is configured to indicate a set of candidate repetition parameters.

In an embodiment, the set of candidate repetition parameters is a proper subset of a first set of numbers of repetition times; the first set of numbers of repetition times includes all candidate numbers of repetition times.

In an embodiment, the first repetition rule is determined based on a number of bits occupied by an indicator for indicating an adopted number of repetition times when the terminal satisfies a use condition of the first modulation mode;

or the first repetition rule is determined based on a set of candidate numbers of repetition times when the terminal satisfies a use condition of the first modulation mode.

In an embodiment, reaching the condition for applying the first modulation mode includes at least one of:

a physical channel satisfying a use condition of the first modulation mode;

the terminal being configured with the parameter related to the first modulation mode;

the terminal being configured with a modulation and coding scheme (MCS) table corresponding to the first modulation mode.

According to a third aspect of embodiments of the disclosure, a transmission configuration apparatus is provided. The apparatus includes:

a processor; and a memory configured to store instructions executable by the processor; in which the processor is configured to perform the transmission configuration method according to the first aspect or any embodiment of the first aspect.

According to a fourth aspect of the disclosure, a non-transitory computer-readable storage medium is provided. When instructions in the storage medium are executed by a processor of a mobile terminal, the mobile terminal is caused to perform the transmission configuration method according to the first aspect or any embodiment of the first aspect.

The technical solutions provided by the embodiments of the present disclosure may include the following beneficial effects: by determining the parameter related to the first modulation mode, and further determining the repetition parameter based on the parameter related to the first modulation mode, the number of repetition times can be effectively limited to achieve an effect of reducing signaling overhead.

FIG. 1 is an architectural diagram of a communication system between a network device and a terminal according to an embodiment. The communication method provided by the present disclosure can be applied to the architecture diagram shown in FIG. 1. As illustrated in FIG. 1, the terminal can receive downlink data transmitted by the network device, and can also transmit uplink data to the network device.

It can be understood that the communication system between the network device and the terminal shown in FIG. 1 is only a schematic illustration, and the wireless communication system may also include other network devices, such as core network devices, wireless relay devices, and wireless backhaul devices etc. which are not shown in FIG. 1. The embodiments of the present disclosure do not limit the number of network devices and the number of terminals included in the wireless communication system.

It can be further understood that the wireless communication system according to the embodiment of the present disclosure is a network that provides a wireless communication function. The wireless communication system can employ various communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), carrier sense multiple access with collision avoidance. According to the capacity, speed, delay and other factors of the network, the network can be classified into a second generation (2G) network, a 3G network, a 4G network or a future evolution network, such as a 5G network. The 5G network can also be referred to as a new radio (NR) network. For convenience of description, the wireless communication network may be referred to as a network for short in the present disclosure.

Further, the network device involved in the present disclosure may also be referred to as a wireless access network device. The wireless access network device may include: a base station, an evolved node base station (evolved node B), a home base station, an access point (AP), a wireless relay node, a wireless backhaul node, a transmission point (TP) or a transmission and reception point (TRP) in a wireless fidelity (WIFI) system, etc. The base station can also be a gNB in an NR system, or can also be a component or a part of a device that constitutes a base station. When it is a vehicle-to-everything (V2X) communication system, the network device may also be a vehicle-mounted device. It should be understood that, in the embodiments of the present disclosure, a specific technology and a specific device form adopted by the network device are not limited.

Further, the terminal involved in the present disclosure may also be referred to as a terminal device, a user equipment (UE), a mobile station (MS), a mobile terminal (MT), etc., which is a device that provides voice and/or data connectivity. For example, the terminal may be a handheld device with a wireless connection function, a vehicle-mounted device, or the like. At present, some examples of terminals include: a mobile phone, a pocket personal computer (PPC), a palmtop computer, a personal digital assistant (PDA), a notebook computer, a tablet computer, a wearable device, or a vehicle-mounted device, etc. In addition, when it is a vehicle-to-everything (V2X) communication system, the terminal device can also be a vehicle-mounted device. It should be understood that the embodiments of the present disclosure do not limit a specific technology and a specific device form adopted by the terminal.

In the embodiments of the disclosure, a transmission configuration method is provided.

Figure 2:
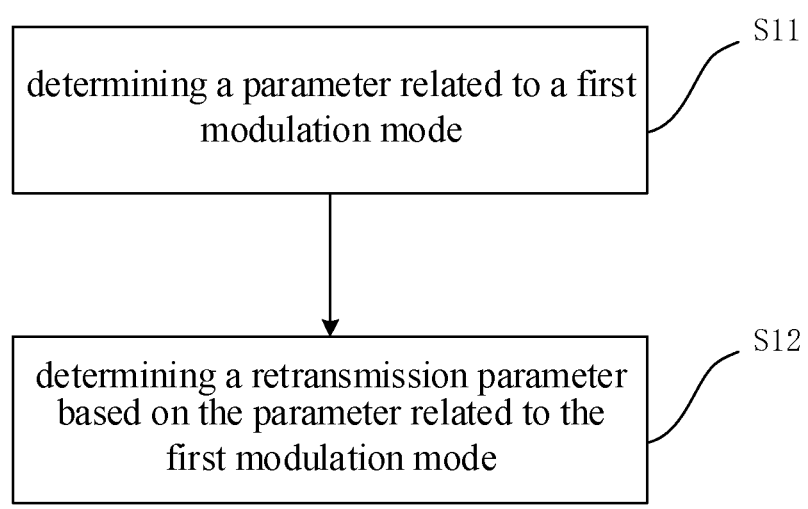
FIG. 2 is a flowchart of a transmission configuration method according to an embodiment.

FIG. 2 is a flowchart of a transmission configuration method according to an embodiment. As illustrated in FIG. 2, the transmission configuration method is applied in a terminal and includes the following steps.

At block S11, a parameter related to a first modulation mode is determined.

At block S12, a repetition parameter is determined based on the parameter related to the first modulation mode.

The first modulation mode may be a 16-symbol quadrature amplitude modulation (16QAM). In the following embodiments of the disclosure, take the 16QAM as an example, but those skilled in the art should understand that the modulation mode in the embodiments is not limited to the 16QAM.

In the embodiment of the disclosure, the terminal determines a parameter related to the first modulation mode, in which the parameter related to the first modulation mode may include any of the following: a modulation and coding scheme (MCS) table associated with the first modulation mode, an indication that the network configures the terminal to use the first modulation mode, and the like. According to the parameter related to the first modulation mode, it is determined whether the terminal satisfies a use condition of the first modulation mode, and further the corresponding repetition parameter when the terminal reaches the condition of applying the first modulation mode is determined.

In the embodiment of the disclosure, reaching the condition for applying the first modulation mode may include at least one of the following:

a physical channel satisfying the use condition of the first modulation mode;

the terminal being configured with the parameter related to the first modulation mode;

the terminal being configured with a modulation and coding scheme (MCS) table corresponding to the first modulation mode.

A transmission configuration method is proposed in the embodiment of the disclosure, and the embodiment can be implemented independently or can be implemented with any of the other embodiments of the disclosure. The method implemented by the disclosure includes: in response to an uplink transmission of the terminal reaching a condition for applying the first modulation mode, determining that the repetition is not performed for the uplink transmission.

In the embodiment of the disclosure, the uplink transmission of the terminal reaches the condition for applying the first modulation mode, for example, a physical uplink shared channel (PUSCH) transmission reaches the condition for applying the first modulation mode, and/or a physical uplink control channel (PUCCH) transmission reaches the condition for applying the first modulation mode, in this case, it is determined that the repetition is not performed for the uplink transmission.

For a downlink transmission of the terminal, for example, a physical downlink control channel (PDCCH), and/or a physical downlink shared channel (PDSCH), if it is determined that the downlink transmission of the terminal reaches the condition for applying the first modulation mode, or it is determined that the downlink transmission of the terminal does not reach the condition for applying the first modulation mode, any one of the following ways can be performed: determining that the repetition is not performed for the downlink transmission of the terminal; or determining that the repetition is performed for the downlink transmission of the terminal; or determining for the downlink transmission of the terminal an adopted number of repetition times from a preconfigured first set of numbers of repetition times; or determining for the downlink transmission of the terminal an adopted number of repetition times from a set of candidate repetition parameters; in which the set of candidate repetition parameters is a proper subset of the first set of numbers of repetition times. In some embodiments, the set of candidate repetition parameters can be indicated by the network side through a first indication message, or can be pre-configured in the terminal, or can be notified to the terminal in any manner. For example, the optional numbers of repetition times included in the first set of numbers of repetition times are 2, 4, 8, and 16; then the optional numbers of repetition times included in the set of candidate repetition parameters are 2, 4. Or the optional numbers of repetition times included in the first set of numbers of repetition times are 4, 8; etc. For example, if the downlink transmission of the terminal does not apply the first modulation mode, a first number of (for example, 4) repetition times may be configured for the downlink transmission of the terminal, and a first number of (for example, 2) bits are used to indicate the adopted number of repetition times. If the downlink transmission of the terminal applies the first modulation mode, a second number of (for example, 2) repetition times can be configured for the downlink transmission of the terminal, and a second number of (for example, 1) bits are used to indicate the adopted number of repetition times. The first number>the second number, of course, this is only an example, and does not limit the embodiment of the present disclosure.

For example, in order to transmit a 4000-bit data packet, in the case where the repetition is not performed, the quadrature phase shift keying (QPSK) is applied. In this case, 1000 bits can be transmitted each time, and it is required to schedule 4 times, use 4 PDCCHs, 4 PDSCHs and 4 hybrid automatic repeat requests (HARQs). If it is determined that the adopted number of repetition times is determined from the preconfigured first set of numbers of repetition times for the downlink transmission of the terminal, or it is determined that the adopted number of repetition times is determined from the set of candidate repetition parameters for the downlink transmission of the terminal, in this case, when a 4000-bit data packet is transmitted, 2000 bits can be transmitted each time, and 2 PDCCHs, 2 PDSCHs and 2 HARQs are required, thereby reducing the overhead of control signaling. It is determined that the repetition is not performed for the uplink transmission.

A transmission configuration method is proposed in the embodiment of the disclosure, and the embodiment can be implemented independently or can be implemented with any of the other embodiments of the disclosure. The method implemented by the disclosure includes: in response to a downlink transmission of the terminal reaching a condition for applying the first modulation mode, determining that the repetition is not performed for the downlink transmission.

In the embodiment of the disclosure, the downlink transmission of the terminal reaches the condition for applying the first modulation mode, for example, a PDCCH transmission reaches the condition for applying the first modulation mode, and/or a PDSCH transmission reaches the condition for applying the first modulation mode, in this case, it is determined that the repetition is not performed for the downlink transmission. For an uplink transmission of the terminal, for example, PUCCH and/or PUSCH, it is determined that the repetition is not performed; or it is determined that that the repetition is performed for the uplink transmission of the terminal; or an adopted number of repetition times is determined for the uplink transmission of the terminal from a set of candidate repetition parameters; in which the set of candidate repetition parameters is a proper subset of the first set of numbers of repetition times, and the set of candidate repetition parameters can be indicated by the network through a first indication message. For example, the optional numbers of repetition times included in the first set of numbers of repetition times are 2, 4, 8, and 16; then the optional numbers of repetition times included in the set of candidate repetition parameters are 2, 4. Or the optional numbers of repetition times included in the first set of numbers of repetition times are 4, 8; etc. Of course, this is only an example, and does not limit the embodiment of the present disclosure.

A transmission configuration method is proposed in the embodiment of the disclosure, and the embodiment can be implemented independently or can be implemented with any of the other embodiments of the disclosure. The method implemented by the disclosure includes: in response to an uplink transmission of the terminal reaching a condition for applying the first modulation mode, determining that the repetition is performed for the uplink transmission based on a first repetition rule.

In the embodiment of the disclosure, the uplink transmission of the terminal reaches the condition for applying the first modulation mode, for example, a PUSCH transmission reaches the condition for applying the first modulation mode, and/or a PUCCH transmission reaches the condition for applying the first modulation mode, in this case, it is determined that the repetition is performed for the uplink transmission based on the first repetition rule. The first repetition rule is used when the terminal reaches the condition for applying the first modulation mode. The first repetition rule is determined based on a number of bits occupied by an indicator for indicating an adopted number of repetition times when the terminal satisfies a use condition of the first modulation mode. Or the first repetition rule is determined based on a set of candidate numbers of repetition times when the terminal satisfies a use condition of the first modulation mode. For example, using one bit to indicate the adopted number of repetition times or using the set of candidate numbers of repetition times including two candidate numbers of repetition times is determined as the first repetition rule. Of course, this is only an example, and does not limit the embodiment of the present disclosure.

For a downlink transmission of the terminal, for example, PDCCH and/or PDSCH, in the embodiment, the downlink transmission of the terminal can be performed in any one of the following ways: determining that the repetition is not performed for the downlink transmission of the terminal; or determining that the repetition is performed for the downlink transmission of the terminal; or determining that an adopted number of repetition times is determined for the downlink transmission of the terminal from a preconfigured first set of numbers of repetition times; or determining that an adopted number of repetition times is determined for the downlink transmission of the terminal from a set of candidate repetition parameters. When determining that the downlink transmission of the terminal reaches the condition for applying the first modulation mode or the downlink transmission of the terminal does not reach the condition for applying the first modulation mode, it may be determined that the adopted number of repetition times is determined from the preconfigured first set of numbers of repetition times for the downlink transmission of the terminal, or it may be determined that the adopted number of repetition times is determined from the set of candidate repetition parameters for the downlink transmission of the terminal. Or it is determined based on a second repetition rule. The second repetition rule is determined based on a number of bits occupied by an indicator for indicating an adopted number of repetition times when the terminal does not satisfy a use condition of the first modulation mode. Or the second repetition rule is determined based on a set of candidate numbers of repetition times when the terminal does not satisfy a use condition of the first modulation mode. For example, using two bits to indicate the adopted number of repetition times or using the set of candidate numbers of repetition times including four candidate numbers of repetition times is determined as the second repetition rule. Of course, this is only an example, and does not limit the embodiment of the present disclosure.

The set of candidate repetition parameters is a proper subset of the first set of numbers of repetition times. In some embodiments, the set of candidate repetition parameters can be indicated by the network side through a first indication message, or can be pre-configured in the terminal, or can be notified to the terminal in any manner. For example, the optional numbers of repetition times included in the first set of numbers of repetition times are 2, 4, 8, and 16; then the optional numbers of repetition times included in the set of candidate repetition parameters are 2, 4. Or the optional numbers of repetition times included in the first set of numbers of repetition times are 4, 8; etc. For example, if the downlink transmission of the terminal does not apply the first modulation mode, a first number of (for example, 4) repetition times may be configured for the downlink transmission of the terminal, and a first number of (for example, 2) bits are used to indicate the adopted number of repetition times. If the downlink transmission of the terminal applies the first modulation mode, a second number of (for example, 2) repetition times can be configured for the downlink transmission of the terminal, and a second number of (for example, 1) bits are used to indicate the adopted number of repetition times. The first number>the second number, of course, this is only an example, and does not limit the embodiment of the present disclosure.

For example, in order to transmit a 4000-bit data packet, in the case where the repetition is not performed, the quadrature phase shift keying (QPSK) is applied. In this case, 1000 bits can be transmitted each time, and it is required to schedule 4 times, use 4 PDCCHs, 4 PDSCHs and 4 hybrid automatic repeat requests (HARQs). If it is determined that the adopted number of repetition times is determined from the preconfigured first set of numbers of repetition times for the downlink transmission of the terminal, or it is determined that the adopted number of repetition times is determined from the set of candidate repetition parameters for the downlink transmission of the terminal, in this case, when a 4000-bit data packet is transmitted, 2000 bits can be transmitted each time, and 2 PDCCHs, 2 PDSCHs and 2 HARQs are required, thereby reducing the overhead of control signaling. It is determined that the repetition is not performed for the uplink transmission.

A transmission configuration method is proposed in the embodiment of the disclosure, and the embodiment can be implemented independently or can be implemented with any of the other embodiments of the disclosure. The method implemented by the disclosure includes: in response to a downlink transmission of the terminal reaching a condition for applying the first modulation mode, determining that the repetition is performed for the downlink transmission based on a first repetition rule.

In the embodiment of the disclosure, the downlink transmission of the terminal reaches the condition for applying the first modulation mode, for example, a PDCCH transmission reaches the condition for applying the first modulation mode, and/or a PDSCH transmission reaches the condition for applying the first modulation mode, in this case, it is determined that the repetition is performed for the downlink transmission based on the first repetition rule. The first repetition rule is used when the terminal reaches the condition for applying the first modulation mode. The first repetition rule is determined based on a number of bits occupied by an indicator for indicating an adopted number of repetition times when the terminal satisfies a use condition of the first modulation mode. Or the first repetition rule is determined based on a set of candidate numbers of repetition times when the terminal satisfies a use condition of the first modulation mode. For example, using one bit to indicate the adopted number of repetition times or using the set of candidate numbers of repetition times including two candidate numbers of repetition times is determined as the first repetition rule. Of course, this is only an example, and does not limit the embodiment of the present disclosure.

For an uplink transmission of the terminal, for example, PUSCH and/or PUCCH, in the embodiment, any one of the following ways can be performed: determining that the repetition is not performed for the uplink transmission of the terminal; or determining that the repetition is performed for the uplink transmission of the terminal; or determining that an adopted number of repetition times is determined for the uplink transmission of the terminal from a preconfigured first set of numbers of repetition times; or determining that an adopted number of repetition times is determined for the uplink transmission of the terminal from a set of candidate repetition parameters. For example, the adopted number of repetition times is determined for the uplink transmission of the terminal from the set of candidate repetition parameters. When determining that the uplink transmission of the terminal reaches the condition for applying the first modulation mode or the uplink transmission of the terminal does not reach the condition for applying the first modulation mode, it may be determined that the adopted number of repetition times is determined from the preconfigured first set of numbers of repetition times for the uplink transmission of the terminal, or it may be determined that the adopted number of repetition times is determined from the set of candidate repetition parameters for the uplink transmission of the terminal. Or it is determined based on a second repetition rule. The second repetition rule is determined based on a number of bits occupied by an indicator for indicating an adopted number of repetition times when the terminal does not satisfy a use condition of the first modulation mode. Or the second repetition rule is determined based on a set of candidate numbers of repetition times when the terminal does not satisfy a use condition of the first modulation mode. For example, using two bits to indicate the adopted number of repetition times or using the set of candidate numbers of repetition times including four candidate numbers of repetition times is determined as the second repetition rule. Of course, this is only an example, and does not limit the embodiment of the present disclosure.

The set of candidate repetition parameters is a proper subset of the first set of numbers of repetition times. In some embodiments, the set of candidate repetition parameters can be indicated by the network side through a first indication message, or can be pre-configured in the terminal, or can be notified to the terminal in any manner. For example, the optional numbers of repetition times included in the first set of numbers of repetition times are 2, 4, 8, and 16; then the optional numbers of repetition times included in the set of candidate repetition parameters are 2, 4. Or the optional numbers of repetition times included in the first set of numbers of repetition times are 4, 8; etc. For example, if the downlink transmission of the terminal does not apply the first modulation mode, a first number of (for example, 4) repetition times may be configured for the downlink transmission of the terminal, and a first number of (for example, 2) bits are used to indicate the adopted number of repetition times. If the downlink transmission of the terminal applies the first modulation mode, a second number of (for example, 2) repetition times can be configured for the downlink transmission of the terminal, and a second number of (for example, 1) bits are used to indicate the adopted number of repetition times. The first number>the second number, of course, this is only an example, and does not limit the embodiment of the present disclosure.

A transmission configuration method is proposed in the embodiment of the disclosure, and the embodiment can be implemented independently or can be implemented with any of the other embodiments of the disclosure. The method implemented by the disclosure includes: in response to both an uplink transmission and a downlink transmission of the terminal reaching a condition for applying the first modulation mode, determining that the repetition is not performed for the uplink transmission and the downlink transmission.

In the embodiment of the disclosure, the uplink transmission of the terminal reaches the condition for applying the first modulation mode, for example, a PUSCH transmission reaches the condition for applying the first modulation mode, and/or a PUCCH transmission reaches the condition for applying the first modulation mode, and the downlink transmission of the terminal reaches the condition for applying the first modulation mode, for example, a PDCCH transmission reaches the condition for applying the first modulation mode, and/or a PDSCH transmission reaches the condition for applying the first modulation mode. It is determined that the repetition is not performed for the uplink transmission and the downlink transmission.

A transmission configuration method is proposed in the embodiment of the disclosure, and the embodiment can be implemented independently or can be implemented with any of the other embodiments of the disclosure. The method implemented by the disclosure includes: in response to both an uplink transmission and a downlink transmission of the terminal reaching a condition for applying the first modulation mode, determining that the repetition is not performed for the uplink transmission.

In the embodiment of the disclosure, the uplink transmission of the terminal reaches the condition for applying the first modulation mode, for example, a PUSCH transmission reaches the condition for applying the first modulation mode, and/or a PUCCH transmission reaches the condition for applying the first modulation mode, and the downlink transmission of the terminal reaches the condition for applying the first modulation mode, for example, a PDCCH transmission reaches the condition for applying the first modulation mode, and/or a PDSCH transmission reaches the condition for applying the first modulation mode. It is determined that the repetition is not performed for the uplink transmission. In the embodiment, the downlink transmission of the terminal may be performed in any of the following ways: determining that the repetition is not performed for the downlink transmission of the terminal; or determining that the repetition is performed for the downlink transmission of the terminal; or determining that an adopted number of repetition times is determined for the downlink transmission of the terminal from a preconfigured first set of numbers of repetition times; or determining that an adopted number of repetition times is determined for the downlink transmission of the terminal from a set of candidate repetition parameters; in which the set of candidate repetition parameters is a proper subset of the first set of numbers of repetition times. In some embodiments, the set of candidate repetition parameters can be indicated by the network side through a first indication message, or can be pre-configured in the terminal, or can be notified to the terminal in any manner. For example, the optional numbers of repetition times included in the first set of numbers of repetition times are 2, 4, 8, and 16; then the optional numbers of repetition times included in the set of candidate repetition parameters are 2, 4. Or the optional numbers of repetition times included in the first set of numbers of repetition times are 4, 8; etc. For example, if the downlink transmission of the terminal does not apply the first modulation mode, a first number of (for example, 4) repetition times may be configured for the downlink transmission of the terminal, and a first number of (for example, 2) bits are used to indicate the adopted number of repetition times. If the downlink transmission of the terminal applies the first modulation mode, a second number of (for example, 2) repetition times can be configured for the downlink transmission of the terminal, and a second number of (for example, 1) bits are used to indicate the adopted number of repetition times. The first number>the second number, of course, this is only an example, and does not limit the embodiment of the present disclosure.

For example, in order to transmit a 4000-bit data packet, in the case where the repetition is not performed, the quadrature phase shift keying (QPSK) is applied. In this case, 1000 bits can be transmitted each time, and it is required to schedule 4 times, use 4 PDCCHs, 4 PDSCHs and 4 hybrid automatic repeat requests (HARQs). If it is determined that the adopted number of repetition times is determined from the preconfigured first set of numbers of repetition times for the downlink transmission of the terminal, or it is determined that the adopted number of repetition times is determined from the set of candidate repetition parameters for the downlink transmission of the terminal, in this case, when a 4000-bit data packet is transmitted, 2000 bits can be transmitted each time, and 2 PDCCHs, 2 PDSCHs and 2 HARQs are required, thereby reducing the overhead of control signaling. It is determined that the repetition is not performed for the uplink transmission.

A transmission configuration method is proposed in the embodiment of the disclosure, and the embodiment can be implemented independently or can be implemented with any of the other embodiments of the disclosure. The method implemented by the disclosure includes: in response to both an uplink transmission and a downlink transmission of the terminal reaching a condition for applying the first modulation mode, determining that the repetition is not performed for the downlink transmission.

In the embodiment of the disclosure, the uplink transmission of the terminal reaches the condition for applying the first modulation mode, for example, a PUSCH transmission reaches the condition for applying the first modulation mode, and/or a PUCCH transmission reaches the condition for applying the first modulation mode, and the downlink transmission of the terminal reaches the condition for applying the first modulation mode, for example, a PDCCH transmission reaches the condition for applying the first modulation mode, and/or a PDSCH transmission reaches the condition for applying the first modulation mode. In this case, it is determined that the repetition is not performed for the downlink transmission. For example, for the uplink transmission of the terminal, for example, PUSCH and/or PUCCH, any of the following ways may be performed: determining that the repetition is not performed for the uplink transmission of the terminal; or determining that the repetition is performed for the uplink transmission of the terminal; or determining that an adopted number of repetition times is determined for the uplink transmission of the terminal from a preconfigured first set of numbers of repetition times; or determining that an adopted number of repetition times is determined for the uplink transmission of the terminal from a set of candidate repetition parameters. For example, it may be determined that the repetition is performed for the uplink transmission, or it may be determined that the repetition is not performed for the uplink transmission, or the adopted number of repetition times is determined for the uplink transmission of the terminal from the set of candidate repetition parameters.

The set of candidate repetition parameters is a proper subset of the first set of numbers of repetition times. In some embodiments, the set of candidate repetition parameters can be indicated by the network side through a first indication message, or can be pre-configured in the terminal, or can be notified to the terminal in any manner. For example, the optional numbers of repetition times included in the first set of numbers of repetition times are 2, 4, 8, and 16; then the optional numbers of repetition times included in the set of candidate repetition parameters are 2, 4. Or the optional numbers of repetition times included in the first set of numbers of repetition times are 4, 8; etc. For example, if the downlink transmission of the terminal does not apply the first modulation mode, a first number of (for example, 4) repetition times may be configured for the downlink transmission of the terminal, and a first number of (for example, 2) bits are used to indicate the adopted number of repetition times. If the downlink transmission of the terminal applies the first modulation mode, a second number of (for example, 2) repetition times can be configured for the downlink transmission of the terminal, and a second number of (for example, 1) bits are used to indicate the adopted number of repetition times. The first number>the second number, of course, this is only an example, and does not limit the embodiment of the present disclosure.

A transmission configuration method is proposed in the embodiment of the disclosure, and the embodiment can be implemented independently or can be implemented with any of the other embodiments of the disclosure. The method implemented by the disclosure includes: in response to both an uplink transmission and a downlink transmission of the terminal reaching a condition for applying the first modulation mode, determining that the repetition is performed for the uplink transmission and/or the downlink transmission based on a first repetition rule.

In the embodiment of the disclosure, the uplink transmission of the terminal reaches the condition for applying the first modulation mode, for example, a PUSCH transmission reaches the condition for applying the first modulation mode, and/or a PUCCH transmission reaches the condition for applying the first modulation mode, and the downlink transmission of the terminal reaches the condition for applying the first modulation mode, for example, a PDCCH transmission reaches the condition for applying the first modulation mode, and/or a PDSCH transmission reaches the condition for applying the first modulation mode. In this case, it is determined that the repetition is performed for the uplink transmission and/or the downlink transmission based on the first repetition rule. The first repetition rule is used when the terminal reaches the condition for applying the first modulation mode. The first repetition rule is determined based on a number of bits occupied by an indicator for indicating an adopted number of repetition times when the terminal satisfies a use condition of the first modulation mode. Or the first repetition rule is determined based on a set of candidate numbers of repetition times when the terminal satisfies a use condition of the first modulation mode. For example, using one bit to indicate the adopted number of repetition times or using the set of candidate numbers of repetition times including two candidate numbers of repetition times is determined as the first repetition rule. Of course, this is only an example, and does not limit the embodiment of the present disclosure.

A transmission configuration method is proposed in the embodiment of the disclosure, and the embodiment can be implemented independently or can be implemented with any of the other embodiments of the disclosure. The method implemented by the disclosure includes: in response to an uplink transmission of the terminal reaching a condition for applying the first modulation mode, determining a repetition parameter corresponding to the uplink transmission from a set of candidate repetition parameters.

In the embodiment, the uplink transmission of the terminal reaches the condition for applying the first modulation mode, for example, a PUSCH transmission reaches the condition for applying the first modulation mode, and/or a PUCCH transmission reaches the condition for applying the first modulation mode. It is determined that an adopted number of repetition times is determined from the set of candidate repetition parameters for the uplink transmission of the terminal.

The set of candidate repetition parameters is a proper subset of the first set of numbers of repetition times. In some embodiments, the set of candidate repetition parameters can be indicated by the network side through a first indication message, or can be pre-configured in the terminal, or can be notified to the terminal in any manner. For example, the optional numbers of repetition times included in the first set of numbers of repetition times are 2, 4, 8, and 16; then the optional numbers of repetition times included in the set of candidate repetition parameters are 2, 4. Or the optional numbers of repetition times included in the first set of numbers of repetition times are 4, 8; etc. For example, if the downlink transmission of the terminal does not apply the first modulation mode, a first number of (for example, 4) repetition times may be configured for the downlink transmission of the terminal, and a first number of (for example, 2) bits are used to indicate the adopted number of repetition times. If the downlink transmission of the terminal applies the first modulation mode, a second number of (for example, 2) repetition times can be configured for the downlink transmission of the terminal, and a second number of (for example, 1) bits are used to indicate the adopted number of repetition times. The first number>the second number, of course, this is only an example, and does not limit the embodiment of the present disclosure.

In the embodiment, the downlink transmission of the terminal may be performed in any of the following ways: determining that the repetition is not performed for the downlink transmission of the terminal; or determining that the repetition is performed for the downlink transmission of the terminal; or determining that an adopted number of repetition times is determined for the downlink transmission of the terminal from a preconfigured first set of numbers of repetition times; or determining that an adopted number of repetition times is determined for the downlink transmission of the terminal from a set of candidate repetition parameters. The set of candidate repetition parameters is a proper subset of the first set of numbers of repetition times. In some embodiments, the set of candidate repetition parameters can be indicated by the network side through a first indication message, or can be pre-configured in the terminal, or can be notified to the terminal in any manner. For example, the optional numbers of repetition times included in the first set of numbers of repetition times are 2, 4, 8, and 16; then the optional numbers of repetition times included in the set of candidate repetition parameters are 2, 4. Or the optional numbers of repetition times included in the first set of numbers of repetition times are 4, 8; etc. For example, if the downlink transmission of the terminal does not apply the first modulation mode, a first number of (for example, 4) repetition times may be configured for the downlink transmission of the terminal, and a first number of (for example, 2) bits are used to indicate the adopted number of repetition times. If the downlink transmission of the terminal applies the first modulation mode, a second number of (for example, 2) repetition times can be configured for the downlink transmission of the terminal, and a second number of (for example, 1) bits are used to indicate the adopted number of repetition times. The first number>the second number, of course, this is only an example, and does not limit the embodiment of the present disclosure.

For example, in order to transmit a 4000-bit data packet, in the case where the repetition is not performed, the quadrature phase shift keying (QPSK) is applied. In this case, 1000 bits can be transmitted each time, and it is required to schedule 4 times, use 4 PDCCHs, 4 PDSCHs and 4 hybrid automatic repeat requests (HARQs). If it is determined that the adopted number of repetition times is determined from the preconfigured first set of numbers of repetition times for the downlink transmission of the terminal, or it is determined that the adopted number of repetition times is determined from the set of candidate repetition parameters for the downlink transmission of the terminal, in this case, when a 4000-bit data packet is transmitted, 2000 bits can be transmitted each time, and 2 PDCCHs, 2 PDSCHs and 2 HARQs are required, thereby reducing the overhead of control signaling.

A transmission configuration method is proposed in the embodiment of the disclosure, and the embodiment can be implemented independently or can be implemented with any of the other embodiments of the disclosure. The method implemented by the disclosure includes: in response to a downlink transmission of the terminal reaching a condition for applying the first modulation mode, determining a repetition parameter corresponding to the downlink transmission from a set of candidate repetition parameters.

In the embodiment, the downlink transmission of the terminal reaches the condition for applying the first modulation mode, for example, a PDCCH transmission reaches the condition for applying the first modulation mode, and/or a PDSCH transmission reaches the condition for applying the first modulation mode. It is determined that an adopted number of repetition times is determined from the set of candidate repetition parameters for the downlink transmission of the terminal.

The set of candidate repetition parameters is a proper subset of the first set of numbers of repetition times. In some embodiments, the set of candidate repetition parameters can be indicated by the network side through a first indication message, or can be pre-configured in the terminal, or can be notified to the terminal in any manner. For example, the optional numbers of repetition times included in the first set of numbers of repetition times are 2, 4, 8, and 16; then the optional numbers of repetition times included in the set of candidate repetition parameters are 2, 4. Or the optional numbers of repetition times included in the first set of numbers of repetition times are 4, 8; etc. For example, if the downlink transmission of the terminal does not apply the first modulation mode, a first number of (for example, 4) repetition times may be configured for the downlink transmission of the terminal, and a first number of (for example, 2) bits are used to indicate the adopted number of repetition times. If the downlink transmission of the terminal applies the first modulation mode, a second number of (for example, 2) repetition times can be configured for the downlink transmission of the terminal, and a second number of (for example, 1) bits are used to indicate the adopted number of repetition times. The first number>the second number, of course, this is only an example, and does not limit the embodiment of the present disclosure.

For example, in order to transmit a 4000-bit data packet, in the case where the repetition is not performed, the quadrature phase shift keying (QPSK) is applied. In this case, 1000 bits can be transmitted each time, and it is required to schedule 4 times, use 4 PDCCHs, 4 PDSCHs and 4 hybrid automatic repeat requests (HARQs). If it is determined that the adopted number of repetition times is determined from the preconfigured first set of numbers of repetition times for the downlink transmission of the terminal, or it is determined that the adopted number of repetition times is determined from the set of candidate repetition parameters for the downlink transmission of the terminal, in this case, when a 4000-bit data packet is transmitted, 2000 bits can be transmitted each time, and 2 PDCCHs, 2 PDSCHs and 2 HARQs are required, thereby reducing the overhead of control signaling.

For the uplink transmission of the terminal, for example, PUSCH and/or PUCCH, any of the following ways may be performed: determining that the repetition is not performed for the uplink transmission of the terminal; or determining that the repetition is performed for the uplink transmission of the terminal; or determining that an adopted number of repetition times is determined for the uplink transmission of the terminal from a preconfigured first set of numbers of repetition times; or determining that an adopted number of repetition times is determined for the uplink transmission of the terminal from a set of candidate repetition parameters. The set of candidate repetition parameters is a proper subset of the first set of numbers of repetition times. In some embodiments, the set of candidate repetition parameters can be indicated by the network side through a first indication message, or can be pre-configured in the terminal, or can be notified to the terminal in any manner. For example, the optional numbers of repetition times included in the first set of numbers of repetition times are 2, 4, 8, and 16; then the optional numbers of repetition times included in the set of candidate repetition parameters are 2, 4. Or the optional numbers of repetition times included in the first set of numbers of repetition times are 4, 8; etc. For example, if the downlink transmission of the terminal does not apply the first modulation mode, a first number of (for example, 4) repetition times may be configured for the downlink transmission of the terminal, and a first number of (for example, 2) bits are used to indicate the adopted number of repetition times. If the downlink transmission of the terminal applies the first modulation mode, a second number of (for example, 2) repetition times can be configured for the downlink transmission of the terminal, and a second number of (for example, 1) bits are used to indicate the adopted number of repetition times. The first number>the second number, of course, this is only an example, and does not limit the embodiment of the present disclosure.

A transmission configuration method is proposed in the embodiment of the disclosure, and the embodiment can be implemented independently or can be implemented with any of the other embodiments of the disclosure. The method implemented by the disclosure includes: in response to both an uplink transmission and a downlink transmission of the terminal reaching a condition for applying the first modulation mode, determining a repetition parameter corresponding to the uplink transmission from a set of candidate repetition parameters.

In the embodiment, the uplink transmission of the terminal reaches the condition for applying the first modulation mode, for example, a PUSCH transmission reaches the condition for applying the first modulation mode, and/or a PUCCH transmission reaches the condition for applying the first modulation mode, and the downlink transmission of the terminal reaches the condition for applying the first modulation mode, for example, a PDCCH transmission reaches the condition for applying the first modulation mode, and/or a PDSCH transmission reaches the condition for applying the first modulation mode. It is determined that an adopted number of repetition times is determined from the set of candidate repetition parameters for the uplink transmission of the terminal.

The set of candidate repetition parameters is a proper subset of the first set of numbers of repetition times. In some embodiments, the set of candidate repetition parameters can be indicated by the network side through a first indication message, or can be pre-configured in the terminal, or can be notified to the terminal in any manner. For example, the optional numbers of repetition times included in the first set of numbers of repetition times are 2, 4, 8, and 16; then the optional numbers of repetition times included in the set of candidate repetition parameters are 2, 4. Or the optional numbers of repetition times included in the first set of numbers of repetition times are 4, 8; etc. For example, if the downlink transmission of the terminal does not apply the first modulation mode, a first number of (for example, 4) repetition times may be configured for the downlink transmission of the terminal, and a first number of (for example, 2) bits are used to indicate the adopted number of repetition times. If the downlink transmission of the terminal applies the first modulation mode, a second number of (for example, 2) repetition times can be configured for the downlink transmission of the terminal, and a second number of (for example, 1) bits are used to indicate the adopted number of repetition times. The first number>the second number, of course, this is only an example, and does not limit the embodiment of the present disclosure.

For the downlink transmission of the terminal, for example, PDCCH and/or PDSCH, in the embodiment, the downlink transmission of the terminal may be performed in any of the following ways: determining that the repetition is not performed for the downlink transmission of the terminal; or determining that the repetition is performed for the downlink transmission of the terminal; or determining that an adopted number of repetition times is determined for the downlink transmission of the terminal from a preconfigured first set of numbers of repetition times; or determining that an adopted number of repetition times is determined for the downlink transmission of the terminal from a set of candidate repetition parameters. The set of candidate repetition parameters is a proper subset of the first set of numbers of repetition times. In some embodiments, the set of candidate repetition parameters can be indicated by the network side through a first indication message, or can be pre-configured in the terminal, or can be notified to the terminal in any manner. For example, the optional numbers of repetition times included in the first set of numbers of repetition times are 2, 4, 8, and 16; then the optional numbers of repetition times included in the set of candidate repetition parameters are 2, 4. Or the optional numbers of repetition times included in the first set of numbers of repetition times are 4, 8; etc. For example, if the downlink transmission of the terminal does not apply the first modulation mode, a first number of (for example, 4) repetition times may be configured for the downlink transmission of the terminal, and a first number of (for example, 2) bits are used to indicate the adopted number of repetition times. If the downlink transmission of the terminal applies the first modulation mode, a second number of (for example, 2) repetition times can be configured for the downlink transmission of the terminal, and a second number of (for example, 1) bits are used to indicate the adopted number of repetition times. The first number>the second number, of course, this is only an example, and does not limit the embodiment of the present disclosure.

For example, in order to transmit a 4000-bit data packet, in the case where the repetition is not performed, the quadrature phase shift keying (QPSK) is applied. In this case, 1000 bits can be transmitted each time, and it is required to schedule 4 times, use 4 PDCCHs, 4 PDSCHs and 4 hybrid automatic repeat requests (HARQs). If it is determined that the adopted number of repetition times is determined from the preconfigured first set of numbers of repetition times for the downlink transmission of the terminal, or it is determined that the adopted number of repetition times is determined from the set of candidate repetition parameters for the downlink transmission of the terminal, in this case, when a 4000-bit data packet is transmitted, 2000 bits can be transmitted each time, and 2 PDCCHs, 2

PDSCHs and 2 HARQs are required, thereby reducing the overhead of control signaling.

A transmission configuration method is proposed in the embodiment of the disclosure, and the embodiment can be implemented independently or can be implemented with any of the other embodiments of the disclosure. The method implemented by the disclosure includes: in response to both an uplink transmission and a downlink transmission of the terminal reaching a condition for applying the first modulation mode, determining a repetition parameter corresponding to the downlink transmission from a set of candidate repetition parameters.

In the embodiment, the uplink transmission of the terminal reaches the condition for applying the first modulation mode, for example, a PUSCH transmission reaches the condition for applying the first modulation mode, and/or a PUCCH transmission reaches the condition for applying the first modulation mode, and the downlink transmission of the terminal reaches the condition for applying the first modulation mode, for example, a PDCCH transmission reaches the condition for applying the first modulation mode, and/or a PDSCH transmission reaches the condition for applying the first modulation mode. It is determined that an adopted number of repetition times is determined from the set of candidate repetition parameters for the downlink transmission of the terminal. The set of candidate repetition parameters is a proper subset of the first set of numbers of repetition times. In some embodiments, the set of candidate repetition parameters can be indicated by the network side through a first indication message, or can be pre-configured in the terminal, or can be notified to the terminal in any manner. For example, the optional numbers of repetition times included in the first set of numbers of repetition times are 2, 4, 8, and 16; then the optional numbers of repetition times included in the set of candidate repetition parameters are 2, 4. Or the optional numbers of repetition times included in the first set of numbers of repetition times are 4, 8; etc. For example, if the downlink transmission of the terminal does not apply the first modulation mode, a first number of (for example, 4) repetition times may be configured for the downlink transmission of the terminal, and a first number of (for example, 2) bits are used to indicate the adopted number of repetition times. If the downlink transmission of the terminal applies the first modulation mode, a second number of (for example, 2) repetition times can be configured for the downlink transmission of the terminal, and a second number of (for example, 1) bits are used to indicate the adopted number of repetition times. The first number>the second number, of course, this is only an example, and does not limit the embodiment of the present disclosure.

For example, in order to transmit a 4000-bit data packet, in the case where the repetition is not performed, the quadrature phase shift keying (QPSK) is applied. In this case, 1000 bits can be transmitted each time, and it is required to schedule 4 times, use 4 PDCCHs, 4 PDSCHs and 4 hybrid automatic repeat requests (HARQs). If it is determined that the adopted number of repetition times is determined from the preconfigured first set of numbers of repetition times for the downlink transmission of the terminal, or it is determined that the adopted number of repetition times is determined from the set of candidate repetition parameters for the downlink transmission of the terminal, in this case, when a 4000-bit data packet is transmitted, 2000 bits can be transmitted each time, and 2 PDCCHs, 2 PDSCHs and 2 HARQs are required, thereby reducing the overhead of control signaling.

For the uplink transmission of the terminal, for example, PUSCH and/or PUCCH, any of the following ways may be performed: determining that the repetition is not performed for the uplink transmission of the terminal; or determining that the repetition is performed for the uplink transmission of the terminal; or determining that an adopted number of repetition times is determined for the uplink transmission of the terminal from a preconfigured first set of numbers of repetition times; or determining that an adopted number of repetition times is determined for the uplink transmission of the terminal from a set of candidate repetition parameters. For example, it may be determined that the repetition is not performed for the uplink transmission, or it may be determined that the repetition is performed for the uplink transmission of the terminal, or the adopted number of repetition times is determined for the uplink transmission of the terminal from the set of candidate repetition parameters.

The set of candidate repetition parameters is a proper subset of the first set of numbers of repetition times. In some embodiments, the set of candidate repetition parameters can be indicated by the network side through a first indication message, or can be pre-configured in the terminal, or can be notified to the terminal in any manner. For example, the optional numbers of repetition times included in the first set of numbers of repetition times are 2, 4, 8, and 16; then the optional numbers of repetition times included in the set of candidate repetition parameters are 2, 4. Or the optional numbers of repetition times included in the first set of numbers of repetition times are 4, 8; etc. For example, if the downlink transmission of the terminal does not apply the first modulation mode, a first number of (for example, 4) repetition times may be configured for the downlink transmission of the terminal, and a first number of (for example, 2) bits are used to indicate the adopted number of repetition times. If the downlink transmission of the terminal applies the first modulation mode, a second number of (for example, 2) repetition times can be configured for the downlink transmission of the terminal, and a second number of (for example, 1) bits are used to indicate the adopted number of repetition times. The first number>the second number, of course, this is only an example, and does not limit the embodiment of the present disclosure.

A transmission configuration method is proposed in the embodiment of the disclosure, and the embodiment can be implemented independently or can be implemented with any of the other embodiments of the disclosure. The method implemented by the disclosure includes: in response to both an uplink transmission and a downlink transmission of the terminal reaching a condition for applying the first modulation mode, determining repetition parameters corresponding respectively to the uplink transmission and the downlink transmission from a set of candidate repetition parameters.

In the embodiment, the uplink transmission of the terminal reaches the condition for applying the first modulation mode, for example, a PUSCH transmission reaches the condition for applying the first modulation mode, and/or a PUCCH transmission reaches the condition for applying the first modulation mode, and the downlink transmission of the terminal reaches the condition for applying the first modulation mode, for example, a PDCCH transmission reaches the condition for applying the first modulation mode, and/or a PDSCH transmission reaches the condition for applying the first modulation mode. It is determined that adopted numbers of repetition times are determined respectively for the uplink transmission and the downlink transmission of the terminal from the set of candidate repetition parameters.

The set of candidate repetition parameters is a proper subset of the first set of numbers of repetition times. In some embodiments, the set of candidate repetition parameters can be indicated by the network side through a first indication message, or can be pre-configured in the terminal, or can be notified to the terminal in any manner. For example, the optional numbers of repetition times included in the first set of numbers of repetition times are 2, 4, 8, and 16; then the optional numbers of repetition times included in the set of candidate repetition parameters are 2, 4. Or the optional numbers of repetition times included in the first set of numbers of repetition times are 4, 8; etc. For example, if the downlink transmission of the terminal does not apply the first modulation mode, a first number of (for example, 4) repetition times may be configured for the downlink transmission of the terminal, and a first number of (for example, 2) bits are used to indicate the adopted number of repetition times. If the downlink transmission of the terminal applies the first modulation mode, a second number of (for example, 2) repetition times can be configured for the downlink transmission of the terminal, and a second number of (for example, 1) bits are used to indicate the adopted number of repetition times. The first number>the second number, of course, this is only an example, and does not limit the embodiment of the present disclosure.

For example, in order to transmit a 4000-bit data packet, in the case where the repetition is not performed, the quadrature phase shift keying (QPSK) is applied. In this case, 1000 bits can be transmitted each time, and it is required to schedule 4 times, use 4 PDCCHs, 4 PDSCHs and 4 hybrid automatic repeat requests (HARQs). If it is determined that the adopted number of repetition times is determined from the preconfigured first set of numbers of repetition times for the downlink transmission of the terminal, or it is determined that the adopted number of repetition times is determined from the set of candidate repetition parameters for the downlink transmission of the terminal, in this case, when a 4000-bit data packet is transmitted, 2000 bits can be transmitted each time, and 2 PDCCHs, 2 PDSCHs and 2 HARQs are required, thereby reducing the overhead of control signaling.

For example, if the uplink transmission of the terminal does not apply the first modulation mode, four optional repetition times may be configured for the uplink transmission of the terminal, and 2 bits are used to indicate the adopted number of repetition times. If the uplink transmission of the terminal applies the first modulation mode, two optional repetition times may be configured for the uplink transmission of the terminal, and 1 bit is used to indicate the adopted number of repetition times. Of course, this is only an example, and does not limit the embodiment of the present disclosure.

Based on the same concept, the embodiments of the disclosure further provide a transmission configuration apparatus.

It can be understood that, in order to implement the above-mentioned functions, the transmission configuration apparatus provided by the embodiments of the present disclosure includes corresponding hardware structures and/or software modules for executing respective functions. In combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Figure 3:
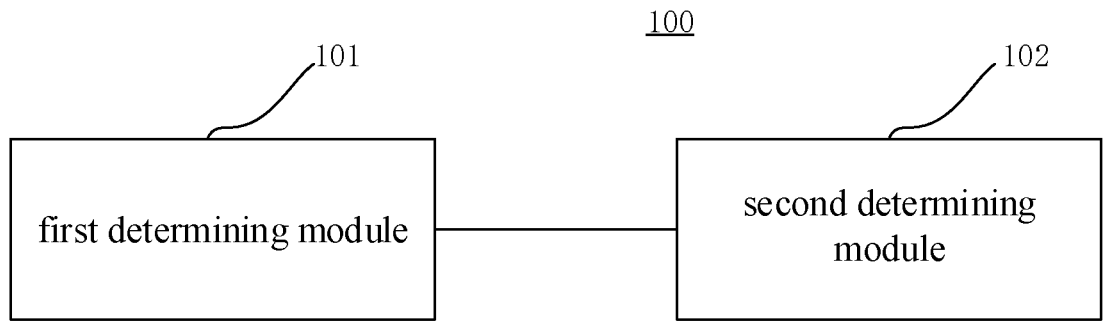
FIG. 3 is a block diagram of a transmission configuration apparatus according to an embodiment.

FIG. 3 is a block diagram of a transmission configuration apparatus according to an embodiment. As illustrated in FIG. 3, the apparatus includes a first determining module 101 and a second determining module 102.

The first determining module 101 is configured to determine a parameter related to a first modulation mode. The second determining module 102 is configured to determine a repetition parameter based on the parameter related to the first modulation mode.

In an embodiment, the second determining module 102 is configured to: in response to an uplink transmission of the terminal reaching a condition for applying the first modulation mode, determine that the repetition is not performed for the uplink transmission; or in response to a downlink transmission of the terminal reaching a condition for applying the first modulation mode, determine that the repetition is not performed for the downlink transmission; or in response to an uplink transmission of the terminal reaching a condition for applying the first modulation mode, determine that the repetition is performed for the uplink transmission based on a first repetition rule, in which the first repetition rule is used when the terminal reaches the condition for applying the first modulation mode; or in response to a downlink transmission of the terminal reaching a condition for applying the first modulation mode, determine that the repetition is performed for the downlink transmission based on a first repetition rule.

In an embodiment, the second determining module 102 is configured to: in response to both an uplink transmission and a downlink transmission of the terminal reaching a condition for applying the first modulation mode, determine that the repetition is not performed for the uplink transmission and the downlink transmission; or in response to both an uplink transmission and a downlink transmission of the terminal reaching a condition for applying the first modulation mode, determine that the repetition is not performed the uplink transmission; or in response to both an uplink transmission and a downlink transmission of the terminal reaching a condition for applying the first modulation mode, determine that the repetition is not performed the downlink transmission; or in response to both an uplink transmission and a downlink transmission of the terminal reaching a condition for applying the first modulation mode, determine that the repetition is performed for the uplink transmission and/or the downlink transmission based on a first repetition rule, in which the first repetition rule is used when the terminal reaches the condition for applying the first modulation mode.

In an embodiment, the second determining module 102 is configured to: in response to an uplink transmission of the terminal reaching a condition for applying the first modulation mode, determine the repetition parameter corresponding to the uplink transmission from a set of candidate repetition parameters; and/or in response to a downlink transmission of the terminal reaching a condition for applying the first modulation mode, determine the repetition parameter corresponding to the downlink transmission from a set of candidate repetition parameters.

In an embodiment, determining the repetition parameter based on the parameter related to the first modulation mode includes:

in response to both an uplink transmission and a downlink transmission of the terminal reaching a condition for applying the first modulation mode, determining the repetition parameter corresponding to the uplink transmission from a set of candidate repetition parameters;
or
in response to both an uplink transmission and a downlink transmission of the terminal reaching a condition for applying the first modulation mode, determining the repetition parameter corresponding to the downlink transmission from a set of candidate repetition parameters;
or
in response to both an uplink transmission and a downlink transmission of the terminal reaching a condition for applying the first modulation mode, determining the repetition parameters corresponding respectively to the uplink transmission and the downlink transmission from a set of candidate repetition parameters.

In an embodiment, the apparatus is further configured to:
receive a first indication message, in which the first indication message is configured to indicate a set of candidate repetition parameters.

In an embodiment, the set of candidate repetition parameters is a proper subset of a first set of numbers of repetition times; the first set of numbers of repetition times includes all candidate numbers of repetition times.

In an embodiment, the first repetition rule is determined based on a number of bits occupied by an indicator for indicating an adopted number of repetition times when the terminal satisfies a use condition of the first modulation mode;
or
the first repetition rule is determined based on a set of candidate numbers of repetition times when the terminal satisfies a use condition of the first modulation mode.

In an embodiment, reaching the condition for applying the first modulation mode includes at least one of:
a physical channel satisfying a use condition of the first modulation mode;
the terminal being configured with the parameter related to the first modulation mode;
the terminal being configured with a modulation and coding scheme (MCS) table corresponding to the first modulation mode.

Regarding the apparatus in the above embodiments, the specific way in which each module performs its operation has been described in detail in the embodiments related to the method, and will not be described in detail here.

Figure 4:
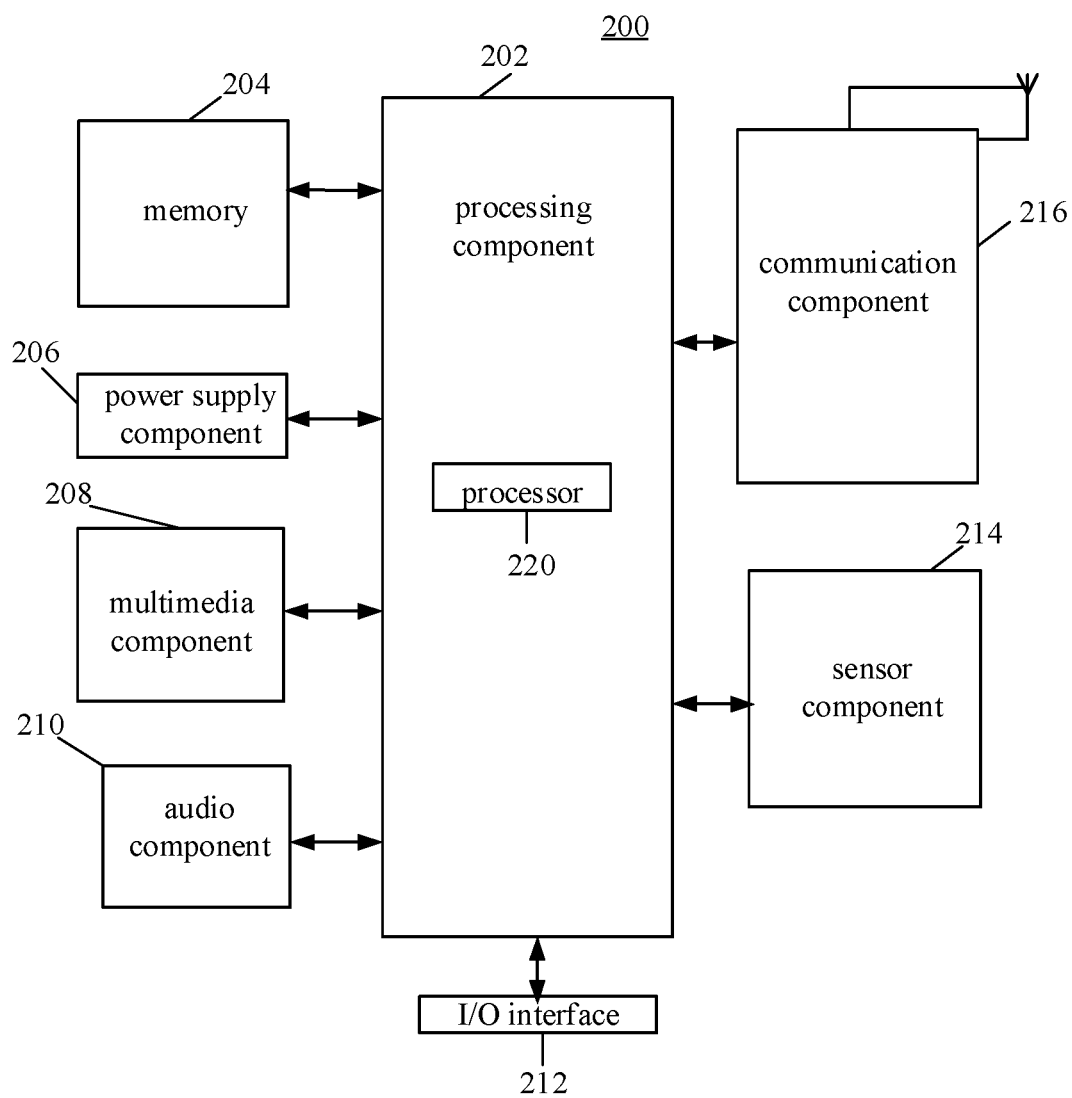
FIG. 4 is a block diagram of a transmission configuration apparatus according to an embodiment.

FIG. 4 is a block diagram of a transmission configuration apparatus 200 according to an embodiment. For example, the apparatus 200 may be a terminal such as a smart phone, a computer, a digital broadcast terminal, a messaging device, a game console, a tablet device, a medical device, a fitness device, a personal digital assistant, and the like.

As illustrated in FIG. 4, the apparatus 200 may include one or more components: a processing component 202, a memory 204, a power supply component 206, a multimedia component 208, an audio component 210, an input/output (I/O) interface 212, a sensor component 214, and a communication component 216.

The processing component 202 generally controls the whole operation of the apparatus 200, such as the operations related to display, phone call, data communication, camera operation and recording operation. The processing component 202 may include one or more processors 220 to perform instructions, to complete all or part of steps of the above method. In addition, the processing component 202 may include one or more modules for the convenience of interaction between the processing component 202 and other components. For example, the processing component 202 may include a multimedia module for the convenience of interaction between the multimedia component 208 and the processing component 202.

The memory 204 is configured to store all types of data to support the operation of the apparatus 200. Examples of the data include the instructions of any applications or methods operated on the apparatus 200, contact data, phone book data, messages, pictures, videos, etc. The memory 204 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 206 may provide power for all components of the apparatus 200. The power supply component 206 may include power supply management system, one or more power supplies, and other units related to generating, managing and distributing power for the apparatus 200.

The multimedia component 208 includes a display screen of an output interface provided between the apparatus 200 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touch, swipe, and gestures on the touch panel. The touch sensor may not only sense the boundaries of a touch or swipe action, but also detect the duration and pressure associated with the touch or swipe action. In some embodiments, the multimedia component 208 includes a front camera and/or a rear camera. When the apparatus 200 is in operation mode, such as shooting mode or video mode, the front camera or the rear camera may receive the external multimedia data. Each front camera and rear camera may be a fixed optical lens system or an optical lens system with a focal length and an optical zoom capacity.

The audio component 210 is configured as output and/or input signal. For example, the audio component 210 includes a microphone (MIC). When the apparatus 200 is in operation mode, such as call mode, record mode, and speech recognition mode, the microphone is configured to receive the external audio signals. The audio signals received may be further stored in the memory 204 or sent via the communication component 216. In some embodiments, the audio component 210 further includes a speaker configured to output an audio signal.

The I/O interface 212 provides an interface for the processing component 202 and the peripheral interface module, and the peripheral interface module may be a keyboard, a click wheel, a button, etc. The buttons may include but not limited to a home button, a volume button, a start button and a lock button.

The sensor component 214 includes one or more sensors, configured to provide various aspects of status assessment for the apparatus 200. For example, the sensor component 214 may detect the on/off state of the apparatus 200 and the relative positioning of the component. For example, the component is a display and a keypad of the apparatus 200. The sensor component 214 may further detect the location change of the apparatus 200 or one component of the apparatus 200, the presence or absence of contact between the user and the apparatus 200, the orientation or acceleration/deceleration of the apparatus 200, and the temperature change of the apparatus 200. The sensor component 214 may include a proximity sensor, which is configured to detect the existence of the objects nearby without any physical contact. The sensor component 214 may further include a light sensor such as CMOS or CCD image sensor, which is configured to use in imaging applications. In some embodiments, the sensor component 214 may further include an acceleration transducer, a gyroscope sensor, a magnetic sensor, a pressure sensor or a temperature sensor.

The communication component 216 is configured for the convenience of wire or wireless communication between the apparatus 200 and other devices. The apparatus 200 may access wireless networks based on a communication standard, such as Wi-Fi, 2G, or 3G, or their combination. In an exemplary embodiment, the communication component 216 receives broadcast signals or broadcast-related information from an external broadcast management system via a broadcast channel. In an exemplary embodiment, the communication component 216 further includes a near field communication (NFC) module to facilitate short-range communication. For example, an NFC module may be implemented based on a radio frequency identification (RFID) technology, an infrared data association (IRDA) technology, an ultra-wideband (UWB) technology, Bluetooth (BT) technology and other technologies.

In an embodiment, the apparatus 200 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above.

In an exemplary embodiment, a non-transitory computer-readable storage medium is further provided which includes instructions, such as the memory 204 including instructions, in which the instructions may be executed by the processor 220 of the apparatus 200 to complete the above method. For example, the non-transitory computer-readable storage medium may be a ROM, a random access memory (RAM), a CD-ROM, a magnetic tape, a floppy disk, an optical data storage device, etc.

Figure 5:
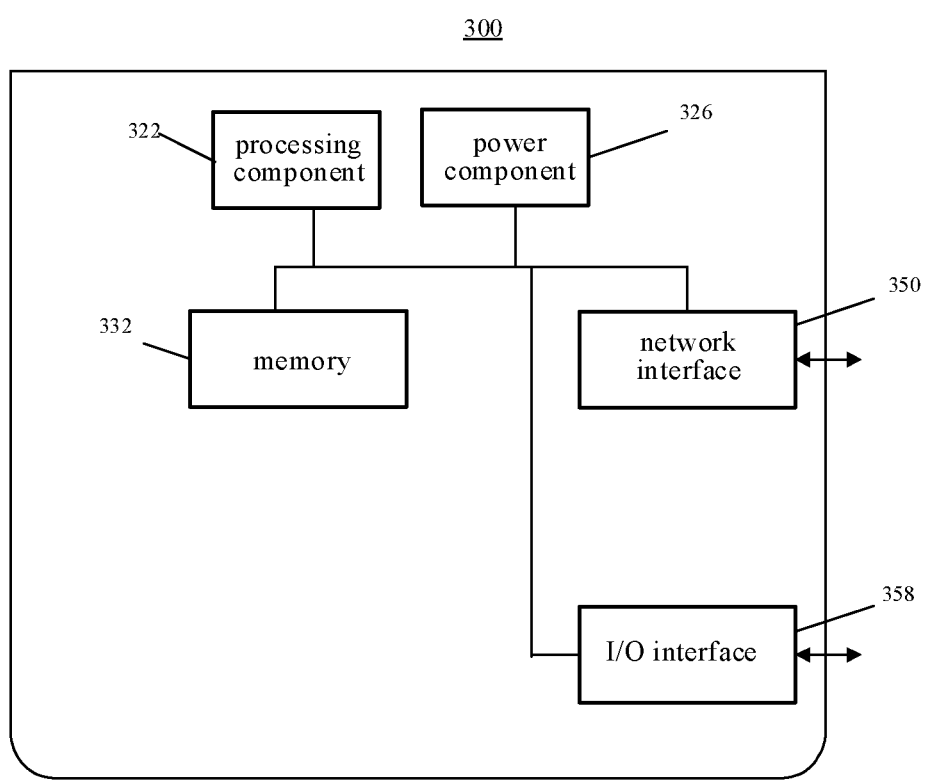
FIG. 5 is a block diagram of a transmission configuration apparatus according to an embodiment.

FIG. 5 is a block diagram of a transmission configuration apparatus 300 according to an embodiment. For example, the apparatus 300 may be provided as a server. As illustrated in FIG. 5, the apparatus 300 includes a processing component 322, which includes one or more processors, and a memory resource represented by a memory 332 for storing instructions executable by the processing component 322, such as application programs. The application program stored in the memory 332 may include one or more modules, each module corresponds to a set of instructions. In addition, the processing component 322 is configured to execute instructions to perform the method described above and applied to the network side device.

The apparatus 300 may also include a power component 326 configured to perform power management of the apparatus 300, a wired or wireless network interface 350 configured to connect the apparatus 300 to the network, and an I/O interface 358. The apparatus 300 may operate based on an operating system stored on the memory 332, such as Windows Server™, Mac OS X™, Unix™, Linux™, FreeBSD™ or the like.

It should be further understood that in the present disclosure, the term "a plurality of" refers to two or more, and other quantifiers are similar. The term "and/or", which describes the association relationship of the associated objects, means that there can be three kinds of relationships, for example, A and/or B, which can mean that A exists alone, A and B exist at the same time, and B exists alone. The character "/" generally indicates an "or" relationship between the associated objects. The singular forms "a," "the," and "the" are intended to include the plural forms as well, unless the context clearly dictates otherwise.

It should be understood that although the terms "first", and "second", may be used in this disclosure to describe various information, the information should not be limited to these terms. These terms are only used to distinguish the same type of information from each other and do not imply a particular order or level of importance. In fact, the expressions "first", "second" etc. are used completely interchangeably. For example, without departing from the scope of the disclosure, the first information may also be referred to as the second information, and similarly, the second information may also be referred to as the first information.

It is further to be understood that although the operations in the embodiments of the present disclosure are described in a specific order in the drawings, it should not be construed as requiring that the operations be performed in the specific order shown or the serial order, or requiring to perform all shown operations to obtain the desired result. In certain circumstances, multitasking and parallel processing may be advantageous.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A transmission configuration method, performed by a terminal, comprising:
   determining a parameter related to a first modulation mode; and
   determining a repetition parameter based on the parameter related to the first modulation mode;
   wherein determining the repetition parameter based on the parameter related to the first modulation mode comprises at least one of:
   in response to an uplink transmission of the terminal reaching a condition for applying the first modulation mode, determining that a repetition is not performed for the uplink transmission;
   in response to a downlink transmission of the terminal reaching a condition for applying the first modulation mode, determining that a repetition is not performed for the downlink transmission;

in response to an uplink transmission of the terminal reaching a condition for applying the first modulation mode, determining that a repetition is performed for the uplink transmission based on a first repetition rule, wherein the first repetition rule is used when the terminal reaches the condition for applying the first modulation mode;

or in response to a downlink transmission of the terminal reaching a condition for applying the first modulation mode, determining that a repetition is performed for the downlink transmission based on a first repetition rule, wherein the first repetition rule is used when the terminal reaches the condition for applying the first modulation mode;

wherein reaching the condition for applying the first modulation mode comprises at least one of:

a physical channel satisfying a use condition of the first modulation mode;

the terminal being configured with the parameter related to the first modulation mode;

or the terminal being configured with a modulation and coding scheme (MCS) table corresponding to the first modulation mode.

2. The method according to claim 1, wherein determining the repetition parameter based on the parameter related to the first modulation mode comprises one of the following:

in response to both an uplink transmission and a downlink transmission of the terminal reaching a condition for applying the first modulation mode, determining that the repetition is not performed for the uplink transmission and the downlink transmission;

in response to both an uplink transmission and a downlink transmission of the terminal reaching a condition for applying the first modulation mode, determining that the repetition is not performed for the uplink transmission;

in response to both an uplink transmission and a downlink transmission of the terminal reaching a condition for applying the first modulation mode, determining that the repetition is not performed for the downlink transmission;

or in response to both an uplink transmission and a downlink transmission of the terminal reaching a condition for applying the first modulation mode, determining that the repetition is performed for the uplink transmission and/or the downlink transmission based on the first repetition rule condition for applying the first modulation mode.

3. The method according to claim 1, wherein determining the repetition parameter based on the parameter related to the first modulation mode comprises at least one of the following:

in response to an uplink transmission of the terminal reaching a condition for applying the first modulation mode, determining the repetition parameter corresponding to the uplink transmission from a set of candidate repetition parameters;

or in response to a downlink transmission of the terminal reaching a condition for applying the first modulation mode, determining the repetition parameter corresponding to the downlink transmission from a set of candidate repetition parameters.

4. The method according to claim 1, wherein determining the repetition parameter based on the parameter related to the first modulation mode comprises one of the following:

in response to both an uplink transmission and a downlink transmission of the terminal reaching a condition for applying the first modulation mode, determining the repetition parameter corresponding to the uplink transmission from a set of candidate repetition parameters;

in response to both an uplink transmission and a downlink transmission of the terminal reaching a condition for applying the first modulation mode, determining the repetition parameter corresponding to the downlink transmission from a set of candidate repetition parameters;

or in response to both an uplink transmission and a downlink transmission of the terminal reaching a condition for applying the first modulation mode, determining the repetition parameters corresponding respectively to the uplink transmission and the downlink transmission from a set of candidate repetition parameters.

5. The method according to claim 1, further comprising: receiving a first indication message, wherein the first indication message is configured to indicate a set of candidate repetition parameters.

6. The method according to claim 5, wherein the set of candidate repetition parameters is a proper subset of a first set of numbers of repetitions; the first set of numbers of repetitions comprises all candidate numbers of repetitions.

7. The method according to claim 1, wherein the first repetition rule is determined based on one of the following:

a number of bits occupied by an indicator for indicating an adopted number of repetition when the terminal satisfies a use condition of the first modulation mode;

or a set of candidate numbers of repetitions when the terminal satisfies a use condition of the first modulation mode.

8. The method according to claim 1, wherein the first modulation mode is a 16-symbol quadrature amplitude modulation (16QAM).

9. A transmission configuration apparatus, comprising:

a processor;

a memory, configured to store instructions executable by the processor;

wherein, the processor is configured to perform a transmission configuration method, comprising:

determining a parameter related to a first modulation mode; and determining a repetition parameter based on the parameter related to the first modulation mode;

wherein determining the repetition parameter based on the parameter related to the first modulation mode comprises at least one of:

in response to an uplink transmission of a terminal reaching a condition for applying the first modulation mode, determining that a repetition is not performed for the uplink transmission;

in response to a downlink transmission of the terminal reaching a condition for applying the first modulation mode, determining that a repetition is not performed for the downlink transmission;

in response to an uplink transmission of the terminal reaching a condition for applying the first modulation mode, determining that a repetition is performed for the uplink transmission based on a first repetition rule, wherein the first repetition rule is used when the terminal reaches the condition for applying the first modulation mode;

or in response to a downlink transmission of the terminal reaching a condition for applying the first modulation mode, determining that a repetition is performed for the downlink transmission based on a first repetition rule, wherein the first repetition rule is used when the terminal reaches the condition for applying the first modulation mode;

wherein reaching the condition for applying the first modulation mode comprises at least one of:

a physical channel satisfying a use condition of the first modulation mode;

the terminal being configured with the parameter related to the first modulation mode; or the terminal being configured with a modulation and coding scheme (MCS) table corresponding to the first modulation mode.

10. The apparatus according to claim 9, wherein determining the repetition parameter based on the parameter related to the first modulation mode comprises one of the following:

in response to both an uplink transmission and a downlink transmission of a terminal reaching a condition for applying the first modulation mode, determining that the repetition is not performed for the uplink transmission and the downlink transmission;

in response to both an uplink transmission and a downlink transmission of the terminal reaching a condition for applying the first modulation mode, determining that the repetition is not performed for the uplink transmission;

in response to both an uplink transmission and a downlink transmission of the terminal reaching a condition for applying the first modulation mode, determining that the repetition is not performed for the downlink transmission;

or in response to both an uplink transmission and a downlink transmission of the terminal reaching a condition for applying the first modulation mode, determining that the repetition is performed for the uplink transmission and/or the downlink transmission based on the first repetition rule.

11. The apparatus according to claim 9, wherein determining the repetition parameter based on the parameter related to the first modulation mode comprises at least one of the following:

in response to an uplink transmission of a terminal reaching a condition for applying the first modulation mode, determining the repetition parameter corresponding to the uplink transmission from a set of candidate repetition parameters;

or in response to a downlink transmission of the terminal reaching a condition for applying the first modulation mode, determining the repetition parameter corresponding to the downlink transmission from a set of candidate repetition parameters.

12. The apparatus according to claim 9, wherein determining the repetition parameter based on the parameter related to the first modulation mode comprises one of the following:

in response to both an uplink transmission and a downlink transmission of a terminal reaching a condition for applying the first modulation mode, determining the repetition parameter corresponding to the uplink transmission from a set of candidate repetition parameters;

in response to both an uplink transmission and a downlink transmission of the terminal reaching a condition for applying the first modulation mode, determining the repetition parameter corresponding to the downlink transmission from a set of candidate repetition parameters;

or in response to both an uplink transmission and a downlink transmission of the terminal reaching a condition for applying the first modulation mode, determining the repetition parameters corresponding respectively to the uplink transmission and the downlink transmission from a set of candidate repetition parameters.

13. The apparatus according to claim 9, wherein the processor is further configured to perform:

receiving a first indication message, wherein the first indication message is configured to indicate a set of candidate repetition parameters.

14. The apparatus according to claim 13, wherein the set of candidate repetition parameters is a proper subset of a first set of numbers of repetitions; the first set of numbers of repetitions comprises all candidate numbers of repetitions.

15. The apparatus according to claim 9, wherein the first repetition rule is determined based on one of the following:

a number of bits occupied by an indicator for indicating an adopted number of repetitions when the terminal satisfies a use condition of the first modulation mode;

or a set of candidate numbers of repetitions when the terminal satisfies a use condition of the first modulation mode.

16. A non-transitory computer-readable storage medium, when instructions in the storage medium are executed by a processor of a mobile terminal, the mobile terminal is caused to perform a transmission configuration method, comprising:

determining a parameter related to a first modulation mode; and determining a repetition parameter based on the parameter related to the first modulation mode;

wherein determining the repetition parameter based on the parameter related to the first modulation mode comprises at least one of:

in response to an uplink transmission of the terminal reaching a condition for applying the first modulation mode, determining that a repetition is not performed for the uplink transmission;

in response to a downlink transmission of the terminal reaching a condition for applying the first modulation mode, determining that a repetition is not performed for the downlink transmission;

in response to an uplink transmission of the terminal reaching a condition for applying the first modulation mode, determining that a repetition is performed for the uplink transmission based on a first repetition rule, wherein the first repetition rule is used when the terminal reaches the condition for applying the first modulation mode;

or in response to a downlink transmission of the terminal reaching a condition for applying the first modulation mode, determining that a repetition is performed for the downlink transmission based on a first repetition rule, wherein the first repetition rule is used when the terminal reaches the condition for applying the first modulation mode;

wherein reaching the condition for applying the first modulation mode comprises at least one of:

a physical channel satisfying a use condition of the first modulation mode;

the terminal being configured with the parameter related to the first modulation mode; or the terminal being configured with a modulation and coding scheme (MCS) table corresponding to the first modulation mode.

\* \* \* \* \*